United States Patent
Habetha et al.

(10) Patent No.: US 9,655,139 B2
(45) Date of Patent: May 16, 2017

(54) DISTRIBUTED BEACONING PERIODS FOR AD-HOC NETWORKS

(75) Inventors: Joerg Habetha, Aachen (DE); Javier del Prado Pavon, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2620 days.

(21) Appl. No.: 10/599,160

(22) PCT Filed: Mar. 21, 2005

(86) PCT No.: PCT/IB2005/050965
§ 371 (c)(1),
(2), (4) Date: Sep. 21, 2006

(87) PCT Pub. No.: WO2005/094007
PCT Pub. Date: Oct. 6, 2005

(65) Prior Publication Data
US 2007/0274206 A1 Nov. 29, 2007

Related U.S. Application Data

(60) Provisional application No. 60/555,915, filed on Mar. 24, 2004, provisional application No. 60/589,358, filed on Jul. 20, 2004.

(51) Int. Cl.
*H04W 74/00* (2009.01)
*H04W 84/18* (2009.01)
*H04W 74/08* (2009.01)

(52) U.S. Cl.
CPC ...... *H04W 74/006* (2013.01); *H04W 74/0891* (2013.01); *H04W 84/18* (2013.01)

(58) Field of Classification Search
CPC H04W 74/006; H04W 74/0891; H04W 84/18
(Continued)

(56) References Cited

U.S. PATENT DOCUMENTS 7,724,713 B2 5/2010 Del Prado Pavon
8,018,912 B2 9/2011 Habetha
(Continued)

FOREIGN PATENT DOCUMENTS

| JP | 2003348636 A | 12/2003 |
|---|---|---|
| JP | 2005245039 A | 9/2005 |
| WO | WO03079593 A1 | 9/2003 |

OTHER PUBLICATIONS

Dynamic Beacon Alignment in Simultaneously operating piconets using the heart beat approach Mar. 16, 2004 Francis Dacosta http://www.ieee802.org/15/pub/TG5OLD.html.*
(Continued)

*Primary Examiner* — Michael Mapa
(74) *Attorney, Agent, or Firm* — Larry Liberchuk (57) ABSTRACT

In a distributed Mac protocol having a slotted superframe (102) comprising at least one slotted beacon period (104) followed by a data transfer period (103), a system and method is provided for creating and maintaining several beacon periods (104) at different positions in the superframe (102). When joining the network (300) a device (301) either joins an existing beacon period (104) or creates a new beacon period (104) at a position in the superframe (102) that does not overlap with existing beacon periods (104) or reservation periods. Beacon periods (104) mutually protect each other by devices (301) announcing the neighboring beacon periods in their beacons.

27 Claims, 7 Drawing Sheets

(58) Field of Classification Search
USPC ........ 370/321–324, 329–330, 337–338, 341, 370/347–348, 350, 442–445, 462; 455/41.2, 426.1, 450–455, 509–516
See application file for complete search history.

(56) References Cited

U.S. PATENT DOCUMENTS

| | | | |
|---|---|---|---|
| 8,045,494 | B2 | 10/2011 | Habetha |
| 9,001,800 | B2 | 4/2015 | Habetha |
| 2001/0012757 | A1* | 8/2001 | Boyle .......................... 455/11.1 |
| 2002/0061031 | A1 | 5/2002 | Sugar |
| 2002/0093929 | A1 | 7/2002 | Mangold |
| 2002/0105970 | A1 | 8/2002 | Shvodian |
| 2003/0012176 | A1* | 1/2003 | Kondylis et al. ............. 370/348 |
| 2003/0063619 | A1* | 4/2003 | Montano .......... H04L 29/12009 370/443 |
| 2003/0103487 | A1* | 6/2003 | Kim et al. ................... 370/350 |
| 2003/0125073 | A1 | 7/2003 | Tsai |
| 2003/0137993 | A1 | 7/2003 | Odman |
| 2003/0169697 | A1* | 9/2003 | Suzuki et al. ................ 370/310 |
| 2003/0214967 | A1* | 11/2003 | Heberling .................... 370/437 |
| 2005/0170835 | A1* | 8/2005 | Ayyagari .............. H04L 5/0007 455/437 |
| 2005/0237965 | A1* | 10/2005 | Kuperschmidt ...... H04L 1/0041 370/321 |
| 2008/0232335 | A1 | 9/2008 | Del Prado Pavon |
| 2008/0247376 | A1 | 10/2008 | Del Prado Pavon |

OTHER PUBLICATIONS

"Specification of the Bluetooth System, Wireless Connections made easy", Core, Version 1.1, Feb. 22, 2001, pp. 1, 92-125.

* cited by examiner

DISTRIBUTED BEACONING PERIODS FOR AD-HOC NETWORKS

This application claims the benefit of U.S. Provisional Application Ser. No. 60/555,915, filed Mar. 24, 2004 and U.S. Provisional Application Ser. No. 60/589,358, filed Jul. 20, 2004 both of which are incorporated in whole by reference.

The present invention relates to a system and method for distributed Beaconing in a wireless personal area network (WPAN).

The MultiBand OFDM Alliance (MBOA) has defined a MAC protocol for ultra-wide band (UWB), see MBOA Wireless Medium Access Control (MAC) Specification For High Rate Wireless Personal Area Networks (WPANs), Technical Specification, Draft 0.5, Apr. 2004, which is hereby incorporated by reference as if fully set forth herein. The MBOA MAC protocol eliminates any need for a network infrastructure by distributing functions across all nodes (devices) of a wireless personal area network (WPAN). All devices send a Beacon at a specific slot in a slotted Beacon Period (BP) 104.

Figure 1:
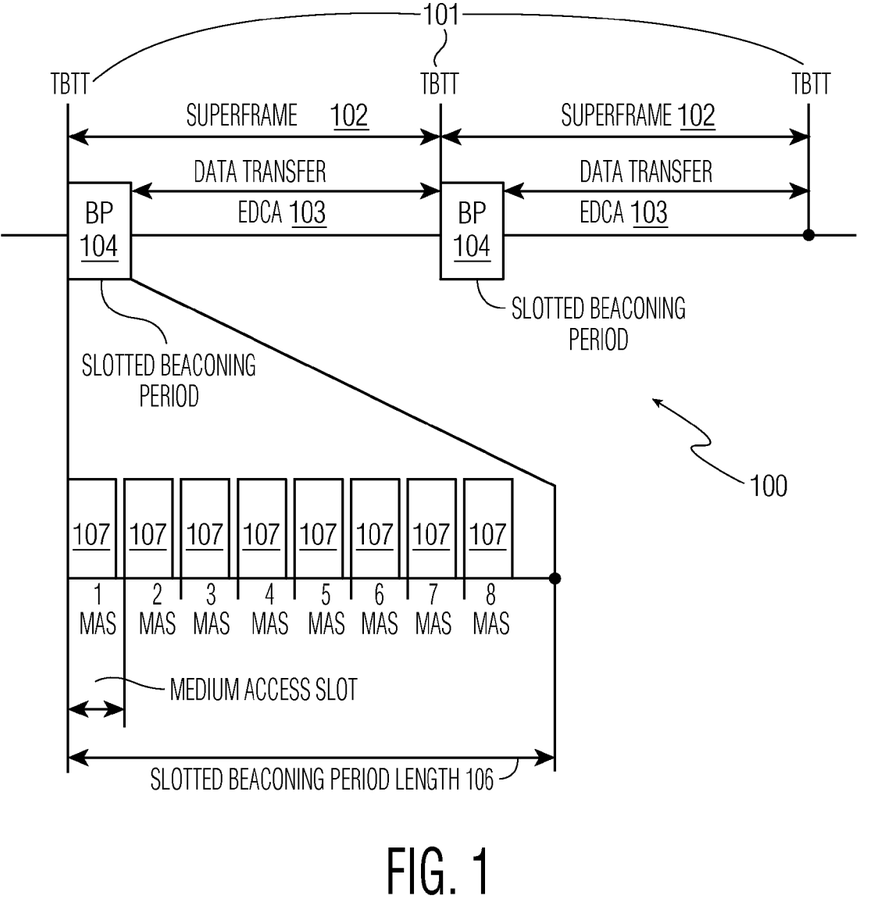
FIG. 1 illustrates a MAC superframe structure according to the present invention.
Figure 2A:
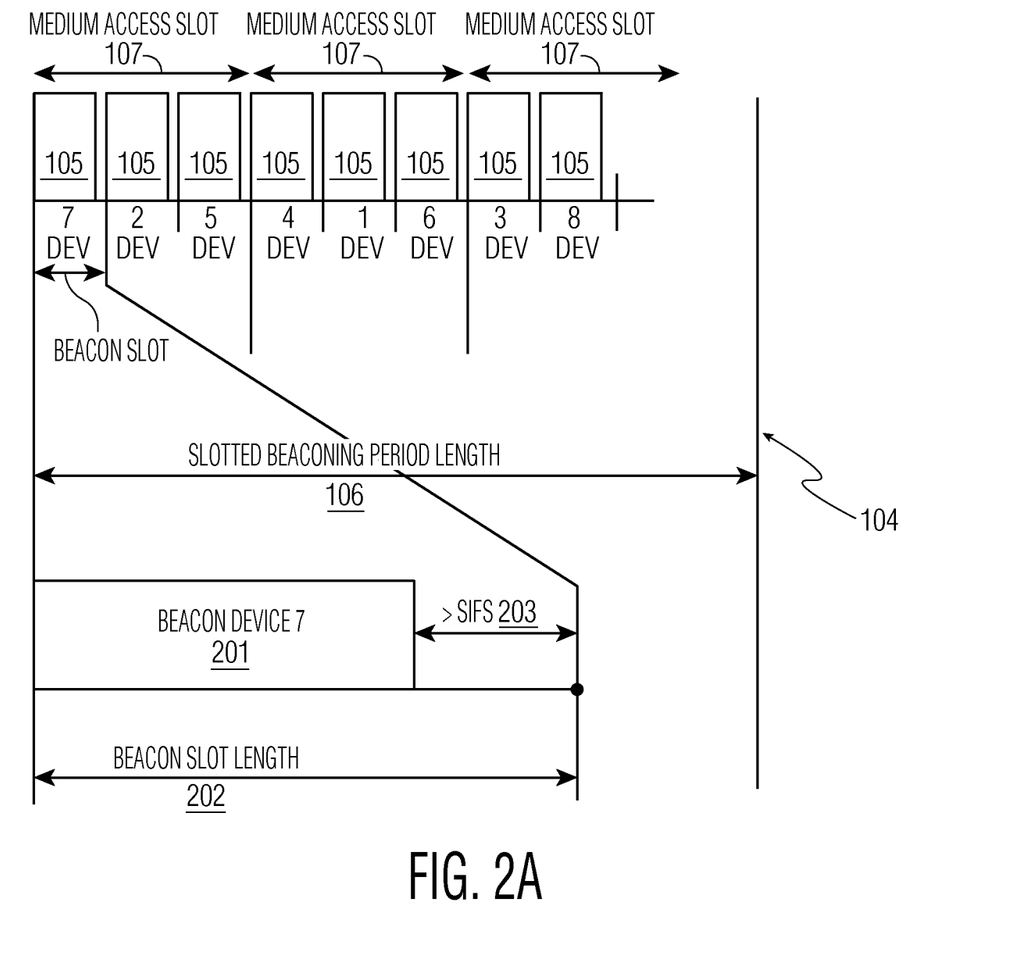
FIG. 2a illustrates a slotted Beaconing period.
Figure 2B:
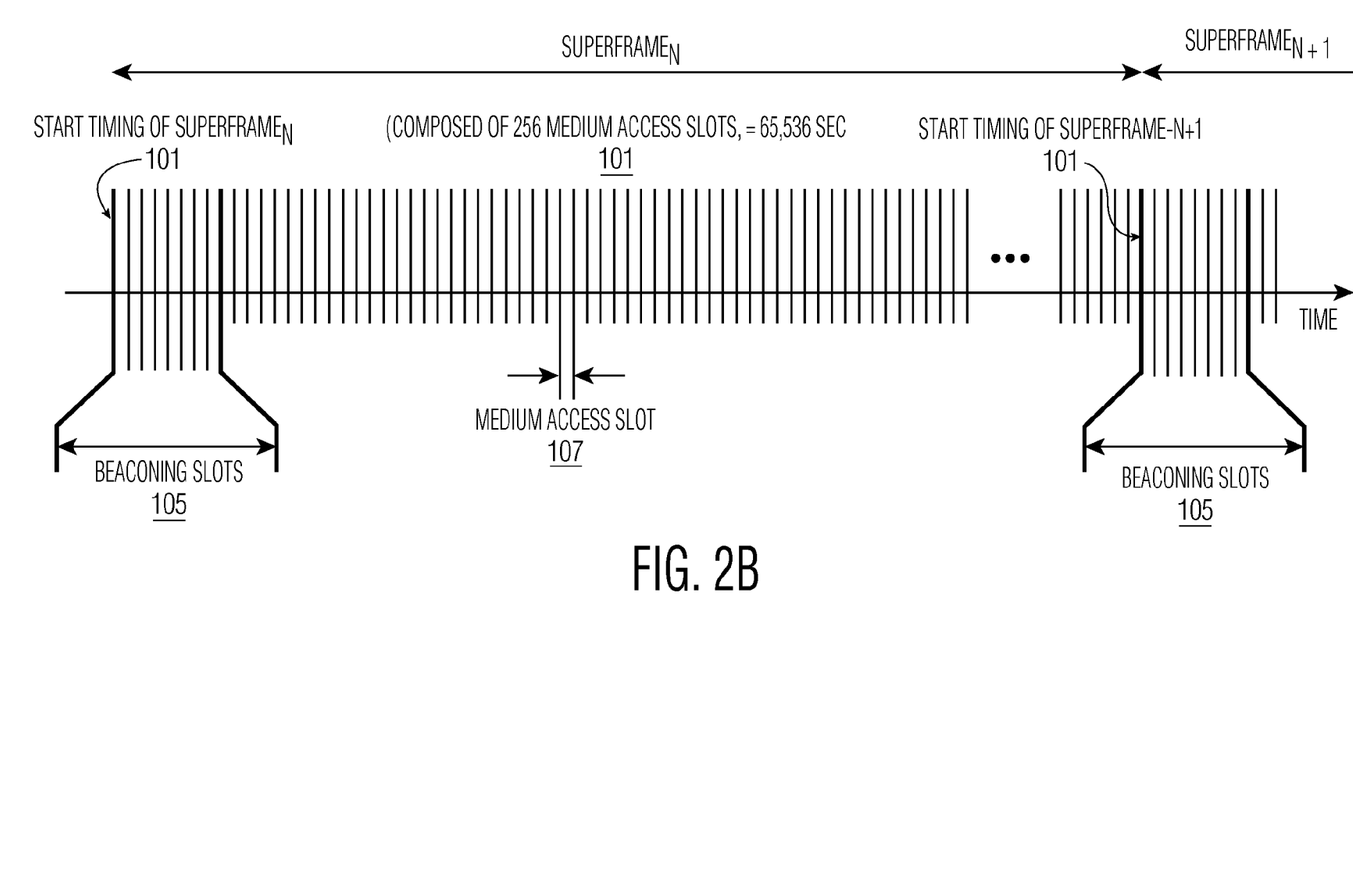
FIG. 2b illustrates a MAS structure of a MAC superframe according to the present invention.

In the MBOA UWB MAC protocol, time is divided into superframes 100, as illustrated in FIG. 1. At the beginning of each superframe there is a Beacon Period (BP) 104 followed by a data transfer period 103. The BP comprises a plurality of medium access slots 107 each having three Beacon slots 105. The BP can be either fixed or variable in length 106. In the data transfer period, two access mechanisms are defined.

The first access mechanism is called "Distributed Reservation Protocol" (DRP). Using DRP, devices can make a reservation for a certain sub-period of the data transfer period 103. The reservation is negotiated between a sender and a receiver(s) of the planned transmission. This negotiation is either carried out by a dedicated signaling handshake, or implicitly by including the reservation information in the sender and receiver(s) Beacons. Once the reservation is established, the reservation information must be included in the Beacon of the sender as well as the receiver(s) in every superframe, in which the reservation is still active. This is necessary in order to inform neighboring devices of the sender and receiver(s) about the existing reservation. No other device beside the sender(s) is allowed to access the medium at the beginning of a reserved period. In order to make efficient usage of unused reservation periods, two types of reservations are defined: soft and hard reservations. In a soft reservation period other devices can access the medium after a certain idle time on the medium. In a hard reservation other devices are only allowed to access the medium after the sender and receiver(s) have signaled the end of their transmission(s) by a NAK-RTS/NAK-CTS signaling handshake.

The second access method is the Enhanced Distributed Coordination Function (EDCA) of IEEE 802.11e, which is based on Carrier Sense Multiple Access (CSMA) with back-off protocol. This random access method is only allowed in non-reserved parts of the data transfer period or in unused reservation periods. Reservations have to be respected by all devices.

In the MBOA distributed MAC protocol Beacons are transmitted in one of the slots of the Beaconing Period as disclosed in provisional application entitled "Beaconing Protocol for Ad-Hoc Networks" that is hereby incorporated by reference as if fully set forth herein. The size of the Beaconing Period determines the number of devices that can join the network. If only one Beaconing Period is allowed there will be some scalability limitations. Moreover, if only one Beacon Period is allowed, when new devices, using a different BP, come into range of existing devices, the BPs need to be re-aligned and synchronized into one single BP, creating a transition state that may cause some communication disruption.

One potential solution to this problem is to send the beacons using EDCA, a contention based access, without the need of coalescing all beacons to a single slotted. Beaconing Period. However, EDCA introduces random delays in the transmission of Beacons. These delays limit the benefits of devices using power management schemes. That is, devices that wake up to receive the Beacons from neighbors, do not exactly know when the Beacons are going to be sent, and therefore need to remain awake for an undetermined period of time. Moreover, if EDCA is used, there is a certain probability that Beacons collide (with other Beacons, or any other transmission), and therefore, reception of Beacons is not guaranteed. In addition, the sender(s) of Beacons(s) do not get any feedback from the receiver(s), and therefore there is no possibility for the sender(s) of the Beacon(s) to detect that their Beacons have collided. Additionally, the beacons are used to announce reservations of the medium. If the beacons collide, devices do not become aware of neighbors reservations, and therefore there is a risk of collisions during the data period as well.

In order to circumvent these disadvantages the present invention provides a MAC protocol having multiple distributed Beaconing Periods accessed using the access method disclosed in provisional application entitled "Beaconing Protocol for Ad-Hoc Networks" that is hereby incorporated by reference as if fully set forth herein.

The present invention employs a superframe structure having a slotted Beaconing Period, see FIG. 1. According to the present invention, a MAC superframe structure is provided that includes slotted Beaconing Periods (BPs) 101 comprising a plurality of MAS slots 107 and a data transfer period 103. All ad-hoc network devices participate in sending Beacons. Medium access in a contention period of the data transfer period 103 is based on an enhanced distributed channel access or EDCA-like mechanism.

A periodic transmission of a Beacon is the technique employed to maintain coordination between communicating devices in an ad hoc network, according to "MultiBand OFDM Alliance Wireless Medium Access Control (MAC) Specification for High Rate Wireless Personal Area Networks (WPANs)", MBOA MAC Specification Draft 0.5, Apr. 2004, that is hereby incorporated by reference as if fully set forth herein. Beacons provide the basic timing for the network including information regarding isochronous reservations. Devices that wish to communicate must belong to the same Beacon Group or set of devices that are within radio range of a given device and that Beacon during the same Beacon Period (BP).

In order to reduce the number of Beacon (and thereby reservation) collisions each device keeps sending its Beacon in the same Beacon slot in subsequent superframes. Surrounding devices, that can receive the Beacon, mark this Beacon slot as occupied. Each device selects its Beacon slot from among the un-occupied Beacon slots of a Beacon Period. Each device has to maintain one additional bitmap to store the occupancy of Beacon slots as well as the number of its own Beacon slot. The status of a Beacon slot is changed from occupied to un-occupied whenever no Beacon has been received in the respective slot for n subsequent superframes, where n is a pre-determined integer.

In a first embodiment, no information regarding the Beacons of other devices is reported in a Beacon.

In a second embodiment the probability of a collision is reduced.

Referring now to FIG. 1, in order to transmit/receive Beacons, devices designate a time period of a superframe as a Beacon Period 104 that is strictly reserved for Beacon transmission and reception. Further, each Beacon Period can be fixed or variable. The group of devices that share this Beacon airtime is termed a Beacon Group. That is, a Beacon Group is defined locally with respect to a given device as a set of devices that synchronize their Beacon transmissions within the same medium access slots (MAS) and that identify these MAS as their BP. As disclosed in provisional application entitled "Beaconing Protocol for Ad-Hoc Networks" a BP is defined by a pre-determined number of contiguous MAS designated by the Beacons of one or more devices, as a BP (also known hereinafter at a slotted Beaconing Period) 104.

A Cluster is a set of devices within the radio range of a device and includes all devices within a Beacon Group. A Cluster may also include devices within the radio range that belong to another Beacon Group.

Other features and advantages of the present invention will be obvious from the following drawings and detailed description of the invention.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

The present invention overcomes the disadvantages of EDCA Beaconing scheme discussed above, by providing a distributed Beaconing method with some modifications to the access method as disclosed in provisional application entitled "Beaconing Protocol for Ad-Hoc Networks."

BP Structure

The channel time is divided into superframes, with each superframe beginning with a BP. The BP is used to send Beacons. FIG. 1 illustrates a MAC superframe structure 100 according to the present invention. In an ad-hoc network all devices participate in sending Beacons. Each MAC superframe structure 102 comprises a sequence of at least one superframe 102 that begins at TBTT or BPST (Beaconing Period Start Time) 101 and continues for a slotted BP Length 106 and followed by a data transfer period 103. The BP Length 106 may be fixed or variable.

Channel Access

In a first embodiment, no information regarding the Beacons of other devices is reported in a Beacon. This reduces the size of the Beacons and the complexity of the Beaconing protocol significantly. However, with such a solution, Beacon collisions might occur in hidden station scenarios, as Beacon information is transmitted only to direct neighbors of a device and not to the neighbors' neighbors. Instead of avoiding such situations before they occur, in this embodiment the collisions are resolved after they have occurred. A device that detects a collision (because an expected Beacon is missing) announces the detection of the collision in its Beacon by including the MAC ID of the device in a collision information field. A device, that detects that its MAC ID is included in another device's Beacon, changes its Beacon position in the subsequent superframe. A special bit in the Beacon is used to announce a forthcoming Beacon position change in the subsequent superframe. This is required in order to allow the neighboring devices to distinguish between missing Beacons due to intentional Beacon position changes and missing Beacons due to Beacon collisions. In order to avoid that constant collision of Beacons, in case that no other device detects a collision, each device periodically changes its Beacon position after m superframes, where m is a pre-determined value.

In a second embodiment, Beacon collisions are not avoided completely, but their probability is simply reduced by changing the Beacon position in every $m^{th}$ superframe, where m is a pre-determined value.

Beacon Periods (BPs) Initialization

Every device that intends to participate in communication with other devices sends a Beacon. When a device is turned on it scans the medium for existing Beacon Periods. The device may decide to join an existing Beacon Period. In this case, a Beacon is sent in one of the empty slots of the existing Beacon Period using the protocol as disclosed in provisional application entitled "Beaconing Protocol for Ad-Hoc Networks" or the modified protocol explained above.

Each device scans the medium for beacons. If no beacon is received, the device sets its own Target Beacon Transmission Time (TBTT) or Beacon Period Start Time (BPST) and transmits a first Beacon. If, however, a beacon is received, the device looks for an empty slot in the Beacon Period and selects one, if one is available. Once a slot is chosen unless a collision is detected, the Beacon is always sent by the device in the same slot. If more than one Beacon is received, then the device synchronizes to the fastest clock.

A device may also decide to create a new Beaconing period, for example, to create a new WUSB cluster. Preferably, new BPs are not created unless it is strictly necessary, for example, due to a lack of empty slots in existing BPs. The new BP must not collide with existing BPs and/or existing DRP reservations. In other words, one of the main reasons to create a new Beacon period may be that the existing Beacon Periods are already fully occupied. A BP may be considered fully occupied if all but the last or all but a few beacon slots are occupied. The last beacon slot may be reserved for specific purposes (like the association of new devices to the ad hoc network or the announcement of other Beacon Periods).

Co-existence of Multiple BPs

If a device decides to create a new BP, it announces the creation of the new BP in the already existing BPs. The new device sends a Beacon in the existing BPs and marks the time used by the new BP as a hard DRP reservation with priority=BP. Devices receiving Beacons that include a DRP reservation with priority BP include a duplicate of the reservation in their own Beacons. The device keeps Beaconing in the existing BPs until a duplicate of its reservation is received in other Beacons. The newly created BP is created so that is does not collide with other existing BPs and must respect existing reservations of the medium from neighbor devices.

It may also happen that multiple BPs need to co-exist due to mobility. When an "alien" BP is detected, a device announces the existence of the "alien" BP and protects it by including a DRP reservation of type BP in its own Beacon with priority=BP.

If existing DRP reservations collide with a BP, the BP has the highest priority, and therefore alternative DRP reservations need to be renegotiated.

If two or more BPs collide, devices with colliding Beacons search for empty Beacon slots. Optionally, these devices may start a new BP in a "non-colliding" time.

In a one embodiment, peer devices Beacon in the same BP. If a transmitter device communicates with devices that beacon in multiple (different) BPs, the transmitter device beacons in said multiple BPs. If communicating devices originally beacon in different BPs, two solutions are possible: either a communicating device stops beaconing in its current B P and starts beaconing in the BPs of the communication partners, or a device continues to beacon in its current BP and additionally starts beaconing in the BPs of the communication partners. The former solution comprises a switch of Beacon Periods. Which devices switch their beacon periods and which devices remain in their current BPs, may e.g. be based on the identifier (ID) of the devices, the number of occupied beacon slots in the BPs of the devices, or the traffic managed by the BP. The device, which stays in its BPs may e.g. be the device with the lowest ID or with the largest number of occupied beacon slots in its BPs or the highest managed traffic in its BPs.

In an alternative embodiment, peer devices may beacon in different BPs. This requires that all devices periodically listen to all BPs in the network.

Switching of BPs

When two or more BPs co-exist, devices may optionally switch to another BP. If a device switches to another BP, the switching device continues Beaconing in the original BP during "x" superframes in order to announce that it's switching BP, where "x" is a predetermined integer. This is done through a special switching announcement field included in the Beacon. The device also includes a DRP reservation of type BP to protect the new BP, if the new BP was not already protected.

Termination of BP

A BP terminates and therefore the DRP BP reservation can be cleared when no Beacons are heard during that BP during "x" consecutive superframes, where x is a predetermined integer.

If a device detects collisions of alien BPs, it may send a Beacon within the colliding BPs and announce the collision. This is done through a special announcement field included in the Beacon.

Figure 3:
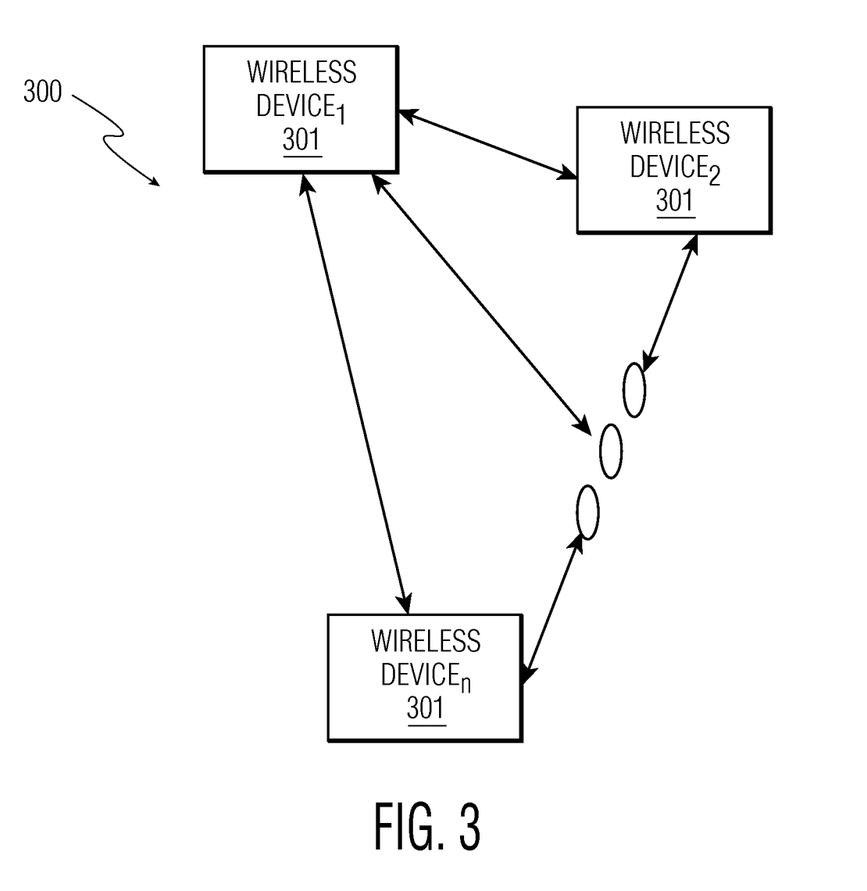
FIG. 3 illustrates an architecture of a wireless communication system whereto embodiments of the present invention are to be applied.

The apparatus and method of the present invention can be used for wireless personal area networks (WPANs) and local area networks (WLANs) 300 in which wireless devices 301 comprise a MAC module modified according to the present invention. FIG. 3 illustrates a representative wireless network whereto embodiments of the present invention are to be applied. According to the principle of the present invention, there is provided a MAC module 400, see FIG. 4, configured to perform a distributed Beaconing Period protocol with slotted channel access. It should be noted that the network illustrated in FIG. 3 is small for purposes of illustration only. In practice, WLANs may include a much larger number of wireless devices incorporating the present invention.

Figure 4:
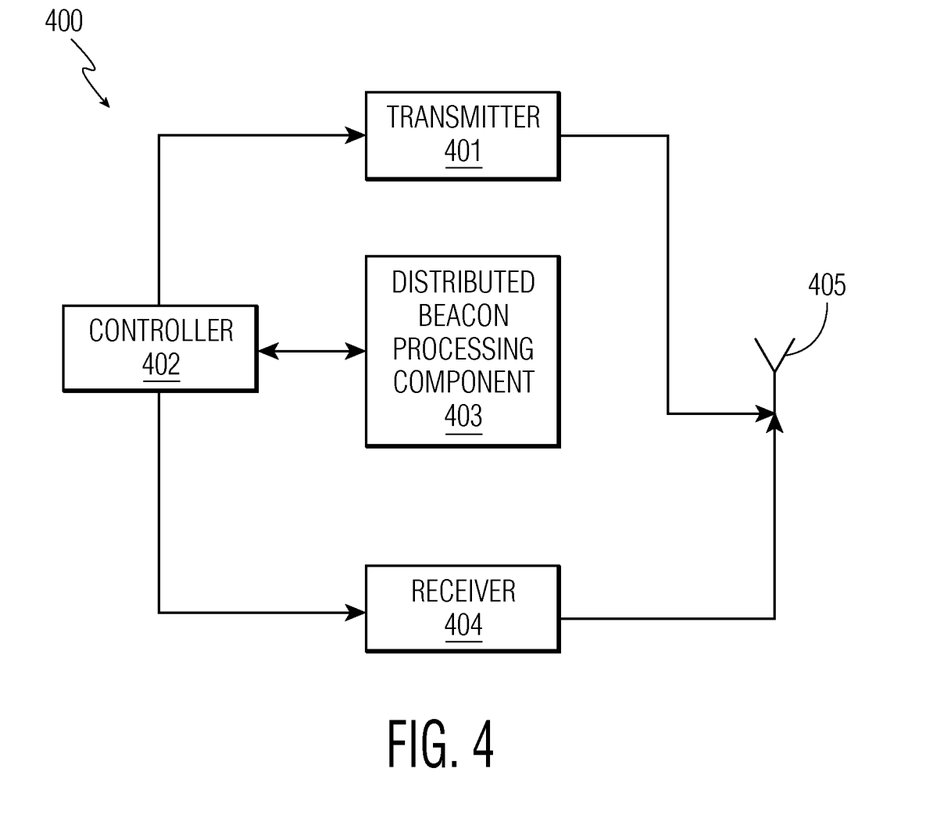
FIG. 4 illustrates a simplified block diagram of a wireless device of the communication system of FIG. 3 according to an embodiment of the present invention.

Referring now to FIG. 4, each device 301 within an ad-hoc network, as illustrated in FIG. 3 may, include a MAC module 400 with an architecture that is illustrated in the block diagram of FIG. 4. Each device 301 may include a MAC module 400 having controller 402 coupled to at least a transmitter 401, a distributed Beacon Period processing component 403 according to the present invention, and a receiver 404. The transmitter 401 and the receiver 404 are coupled to an antenna 405. The distributed Beacon Period processing component 403 provides adaptive programming such that, for example, multiple BPs can coexist where a BP can be "native", i.e., according to the present invention, as well as an "alien" BP, i.e., according to another protocol such as IEEE 802.11

Figure 5:
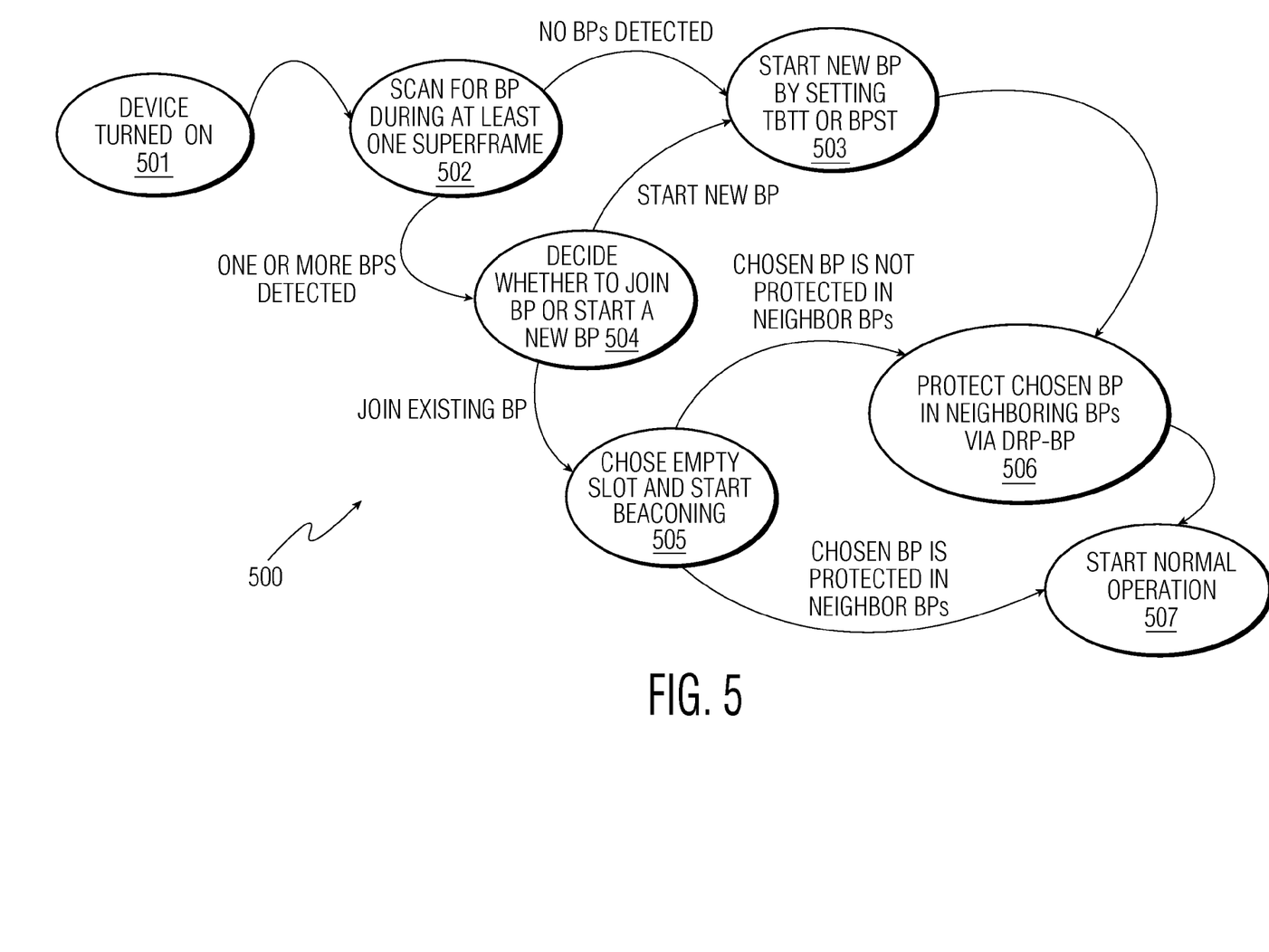
FIG. 5 illustrates a finite state diagram for a synchronization functionality of the Distributed Beacon processing component.

Referring now to FIG. 5, when a device is turned on 501, it scans for existing BPs during at least one superframe 502. A BP is detected if one or more Beacons are received. A BP is identified by its Beaconing Period Start Time (BPST). If no BPs are detected, the device creates a new Beaconing Period by sending a Beacon and setting the BPST 503. The device can choose the BPST randomly.

If one or more BP is detected, the device can join an existing Beaconing Period by sending a Beacon in one of the empty slots 505 or can start a new BP 503. The new BPST is chosen so it does not collide with existing BPs and/or DRP reservations.

If one or more BPs were detected during the scanning process, the device decodes neighbors' Beacons and makes sure that the BP is already protected in the neighboring BP(s) via a DRP reservation. If its own BP is not protected in the neighbor BP(s), the device sends a Beacon in the neighbor BP(s), during N predetermined number of superframes, in order to announce and protect its own BP 506. The Beacon also includes a DRP information element (IE) indicating a DRP reservation of type BP.

If the new BP is already protected, the device directly starts normal operation 507.

Figure 6:
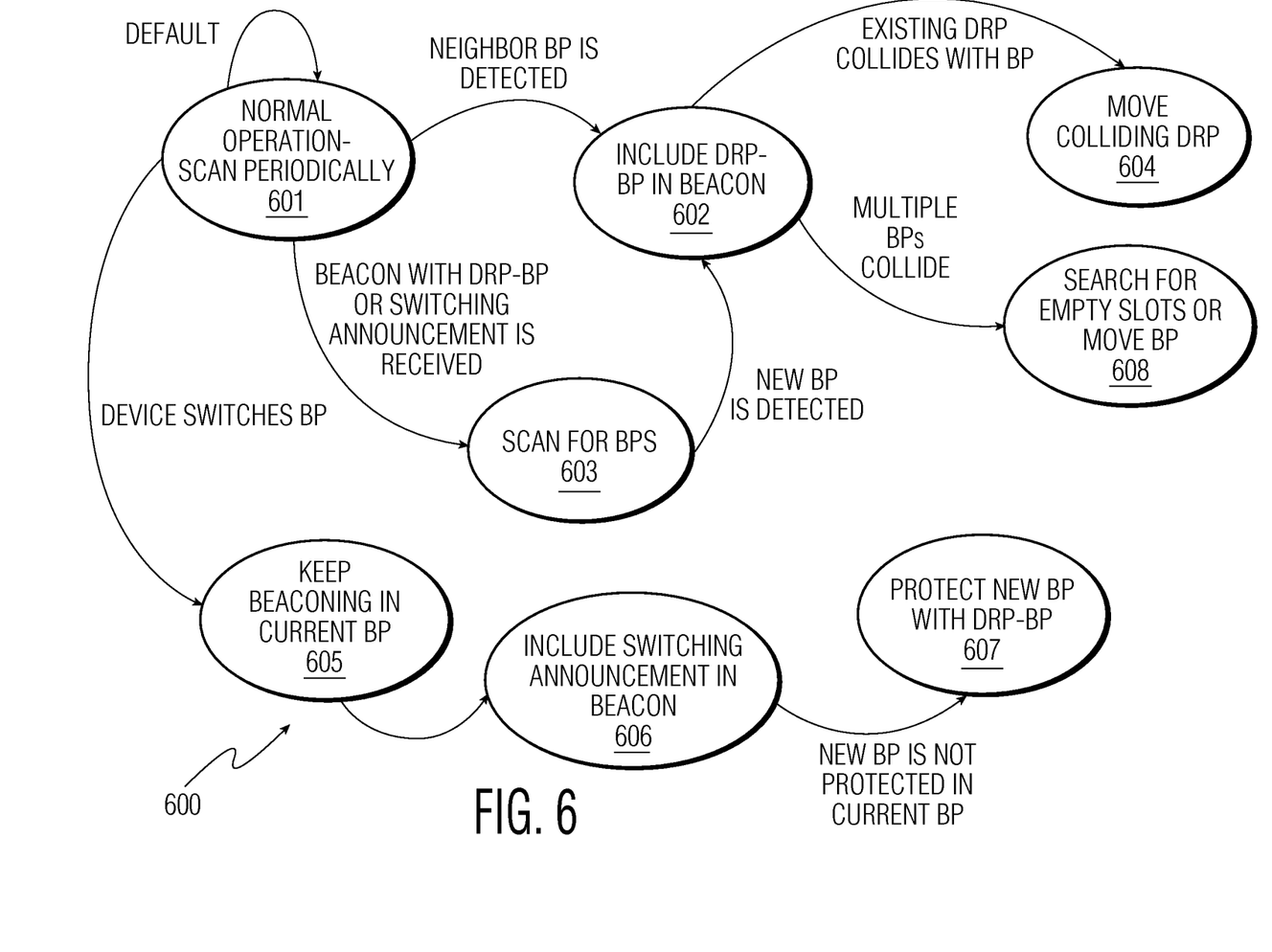
FIG. 6 illustrates a finite state diagram for a periodic scanning functionality of the Distributed Beacon processing component to detect new BPs in order to maintain the state of existing reservations and resolve collisions.

Referring now to FIG. 6, devices periodically scan to detect new BPs 601 in order to maintain the state of existing reservations, and potentially resolve collisions. If a neighbor BP is detected, the device includes a DRP of type BP in its own beacon 602. Devices that receive a beacon that includes a DRP reservation of type BP or a switching announcement, scan for neighbor BPs 603. If, during the scanning process, a neighbor BP is detected, a DRP reservation of type BP is included in its own beacon 602.

If existing DRP reservations collide with a BP, the BP has the highest priority, and therefore other DRP reservations are renegotiated and moved 604. If two or more BPs collide, devices with colliding beacons search for empty non-colliding slots or start a new BP in other idle slots 607.

When two or more BPs exist, devices optionally switch to another BP. If a device leaves the current BP(s), it keeps beaconing in the current BP(s) 605 during N predetermined number of superframes in order to announce that it's leaving the BP(s). The beacon sent in the current BP(s) includes a switching BP announcement 606. If the new BP is not protected in current BP, the device also includes a DRP of type BP.

While the preferred embodiments of the present invention have been illustrated and described, it will be understood by those skilled in the art that the embodiments as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. A method for a distributed beaconing period protocol for a device in an ad hoc network of devices, the method comprising:
dividing a medium access time into a sequence of at least one contiguous superframe beginning at a Beacon Period Start Time;
partitioning the superframe into a slotted Beaconing Period (BP), having a plurality of contiguous beacon slots, followed by a data transfer period;
associating with at least one of an existing ad hoc network BP or creating a new ad hoc network BP as the BP of the device, wherein the device stores an occupancy of the beacon slots and its own beacon slot number of the Beaconing Period, wherein
when the BP of the device is not protected in at least one neighboring BP, protecting the BP by including a first reservation for the BP in the beacon of the device in the at least one neighboring BP, and
when the BP of the device is protected, operating normally by receiving beacons over the medium; and when a beacon comprising a Distributed Reservation Protocol (DRP) reservation of type BP is received, scanning for a new BP, and when a new BP is detected, protecting the new BP.

2. The method of claim 1, wherein the first reservation is a Distributed Reservation Protocol (DRP) reservation of type BP and priority =BP.

3. The method of claim 1, wherein the associating further comprises:
choosing an empty slot of the BP of the device; and
beaconing a beacon of the device in the chosen empty slot.

4. The method of claim 3, further comprising including information regarding beacons of other devices in the beacon of the device.

5. The method of claim 4, wherein the protecting the unprotected BP further comprises including a second reservation in the beacon of the device to announce the BP of said other devices.

6. The method of claim 5, wherein the second reservation is a Distributed Reservation Protocol (DRP) reservation of type BP and priority =BP.

7. The method of claim 1, wherein the associating comprises:
scanning the medium to detect at least one BP during the at least one superframe;
when at least one BP is not detected, starting the new ad hoc network BP as the BP of the device at a beacon period start time calculated in a pre-determined manner; and
when at least one BP is detected:
joining at least one of the at least one detected BP as the BPs of the device, or starting the new ad hoc network BP as the BP of the device at a beacon period start time determined in a pre-determined manner.

8. The method of claim 7, wherein the associating further comprises:
choosing an empty slot of the BP of the device and beaconing a beacon of the device in the chosen empty slot.

9. The method of claim 8, further comprising including information regarding beacons of other devices in the beacon of the device.

10. The method of claim 6, wherein the protecting further comprises including a third reservation in the beacon of the device in the neighboring BPs to announce the BP.

11. The method of claim 1, wherein the third reservation is a Distributed Reservation Protocol (DRP) reservation of type BP and priority =BP.

12. The method of claim 1, wherein the protecting further comprises including a fourth reservation in the beacon of the device to protect the BP.

13. The method of claim 12, wherein the fourth reservation is a DRP reservation of type BP and priority =BP.

14. The method of claim 1, wherein the operating normally further comprises a device optionally switching BP, when two or more BPs co-exist.

15. The method of claim 14, wherein the switching BP by the device further comprises:
including a special switching announcement field in a beacon to announce a new BP; and
beaconing for at least a predetermined announcement number of consecutive superframes with the beacon including the special switching announcement field.

16. The method of claim 15, wherein the beaconing further comprises:
including a DRP reservation of type BP to protect the new BP, when the new BP is not already protected, stopping transmission of the beacon, when the new BP is already protected; and
transmitting a beacon in the new BP.

17. The method of claim 15, wherein the operating normally further comprises:
when a beacon comprising a BP switching announcement of another device is received,
scanning for a new BP, and
when a new BP is detected, protecting the new BP.

18. The method of claim 1, wherein the operating normally further comprises terminating the BP.

19. The method of claim 1, wherein the operating normally further comprises clearing a Distributed Reservation Protocol (DRP) BP reservation of the device when no beacons are received during the BP for a pre-determined clearing number of consecutive superframes.

20. The method of claim 1, wherein the operating normally further comprises when at least two BPs collide, until there are no longer any colliding BPs, repeatedly performing:
searching each colliding BP for enough empty beacon slots for devices of another colliding BP, and
moving at least one colliding BP to a non-colliding beacon period start time; or
searching the superframe for enough empty beacon slots for the BP, and
moving the BP to the empty slots in the superframe.

21. The method of claim 20, wherein the operating normally further comprises when an existing DRP reservation collides with a BP, moving a colliding DRP reservation to a non-colliding time.

22. The method of claim 20, wherein the operating normally further comprises moving the BP to a non-colliding time when an existing DRP reservation collides with a BP.

23. The method of claim 1, further comprising each device of the network of devices beaconing in the same BP, by performing a selected one from the group consisting of:
   beaconing in parallel in each BP of each device of said network of devices; and
   switching a BP to beacon in a same BP as other devices of said network of devices.

24. The method of claim 23, wherein a device that does not have to switch the BP is chosen in a distributed way based on an identifier of each device of said network of devices.

25. The method of claim 23, wherein a device that does not have to switch the BP is chosen in a distributed way based on a number of occupied beacon slots in the BP of each device of said network of devices.

26. The method of claim 23, wherein a device that does not have to switch the BP is chosen in a distributed way based on a size of a portion of the superframe that is reserved by the beacons in a BP of a device of said network of devices.

27. The method of claim 1, wherein each device of said network of devices may beacon in a different BP.

* * * * *